United States Patent
Dharmarajan et al.

(10) Patent No.: US 7,844,826 B1
(45) Date of Patent: *Nov. 30, 2010

(54) METHOD AND APPARATUS FOR COMMUNICATING AUTHORIZATION DATA

(75) Inventors: Baskaran Dharmarajan, Mountain View, CA (US); Ismail Cem Paya, Gainesville, FL (US); Ashvin J Mathew, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/206,371

(22) Filed: Sep. 8, 2008

Related U.S. Application Data (63) Continuation of application No. 10/674,105, filed on Sep. 29, 2003, now Pat. No. 7,444,518.

(60) Provisional application No. 60/478,748, filed on Jun. 16, 2003.

(51) Int. Cl.
*H04K 1/00* (2006.01)
(52) U.S. Cl. .......................... 713/185; 713/182; 726/2; 726/9; 709/219
(58) Field of Classification Search ................ 713/185, 713/182, 2, 3, 9; 726/10
See application file for complete search history.

(56) References Cited

U.S. PATENT DOCUMENTS

| | | | |
|---|---|---|---|
| 5,706,507 A | 1/1998 | Schloss | |
| 5,758,258 A | 5/1998 | Shoff et al. | |
| 5,845,260 A | 12/1998 | Nakano et al. | |
| 5,953,710 A | 9/1999 | Fleming | |
| 6,163,272 A | 12/2000 | Goode et al. | |
| 6,189,032 B1 | 2/2001 | Susaki et al. | |
| 6,571,256 B1 | 5/2003 | Dorian et al. | |
| 6,922,843 B1 | 7/2005 | Herrington et al. | |
| 7,085,937 B1 | 8/2006 | Rezvani et al. | |
| 7,103,663 B2 | 9/2006 | Inoue et al. | |
| 7,197,568 B2 | 3/2007 | Bourne et al. | |
| 7,254,831 B2 | 8/2007 | Saunders et al. | |
| 7,444,518 B1 | 10/2008 | Dharmarajan et al. | |
| 2002/0049806 A1 | 4/2002 | Gatz et al. | |
| 2002/0120866 A1 | 8/2002 | Mitchell et al. | |
| 2003/0001016 A1 | 1/2003 | Fraier et al. | |
| 2004/0003071 A1 | 1/2004 | Mathew et al. | |
| 2005/0144297 A1 | 6/2005 | Dahlstrom et al. | |

*Primary Examiner*—Kimyen Vu
*Assistant Examiner*—April Y Shan
(74) *Attorney, Agent, or Firm*—Lee & Hayes, PLLC (57) ABSTRACT

A permission level associated with an entity's access to a Web server is identified. A relationship ticket is obtained from an authentication server and a request is generated to set the identified permission level. The request and the relationship ticket are sent to the Web server and a success code is received from the Web server if the requested permission level is established.

17 Claims, 5 Drawing Sheets

METHOD AND APPARATUS FOR COMMUNICATING AUTHORIZATION DATA

RELATED APPLICATIONS

This application is a continuation of prior pending U.S. patent application Ser. No. 10/674,105, filed Sep. 29, 2003, which claims the benefit of U.S. Provisional Application No. 60/478,748, filed Jun. 16, 2003, entitled "Server-To-Server Communication of Parental Control Authorization Tokens", both of which are herein incorporated by reference in their entirety. Any disclaimer that may have occurred during the prosecution of the above-referenced application(s) is hereby expressly rescinded, and reconsideration of all relevant art is respectfully requested.

TECHNICAL FIELD

The systems and methods described herein relate to establishing, modifying and implementing permissions regarding access to Web-based content.

BACKGROUND

Increasing usage of the Internet and Web servers accessible via the Internet requires systems and methods to control access to Web servers and Web-based services. Web servers are typically capable of generating and distributing multiple Web pages containing a variety of different information. Some of this information may be confidential or otherwise restricted to being accessed by a particular group of individuals. For example, certain Web page content may be inappropriate for children. Other Web page content may be authorized for access by officers and directors of a company, but not for hourly employees.

The permissions or authorizations associated with a particular user needs to be reliably communicated to various Web servers and other Web-based service or information providers such that Web-based content is limited in the manner desired by a parent, an employer, a teacher, or other individual or entity. Many existing Web-based systems do not provide an access control mechanism to enforce the permissions desired by a parent, employer, or teacher. Existing Web-based systems that do provide an access control mechanism do not necessarily provide a secure process for establishing and modifying the access permissions associated with children, employees, or students. Without a secure mechanism for setting, modifying and enforcing access permissions, certain individuals may be able to access unauthorized Web content or Web services.

In certain Web-based systems, data is exchanged using untrusted connections. For example, these untrusted connections may include unsecure connections to the Internet and/or connections to one or more servers accessible via the Internet. Another example of an untrusted connection is a connection to a Web-server in which the identity and/or privileges of the user establishing the connection have not been verified. Thus, the Web-server cannot be certain that the user establishing the connection is authorized to perform the requested functions or retrieve the requested information.

Accordingly, it is desirable to provide a mechanism for securely defining user permissions and controlling the user's access to Web-based content using those permissions.

SUMMARY

The systems and methods described herein relate to permissions for accessing Web-based content. In one embodiment, a method identifies a selected permission level associated with a child's access to a Web server. A relationship ticket is obtained from an authentication server and a request to set the identified permission level is generated. The request and the relationship ticket are sent to the Web server. If the requested permission level is established, a success code is received from the Web server.

BRIEF DESCRIPTION OF THE DRAWINGS

Similar reference numbers are used throughout the figures to reference like components and/or features.

DETAILED DESCRIPTION

The systems and methods discussed herein communicate authorization information between devices, such as servers, thereby allowing each device to apply the authorization information to users requesting information or services from the device. These systems and methods provide a secure way of distributing, for example, parent-child relationship and permission information from a central relationship and permission database to other Internet Web sites. The authorization information (also referred to as "relationship and permission information") includes, for example, parental control authorization information related to the a child of the parent. Other examples of authorization information include employer authorization information related to an employee of the employer and teacher authorization information related to a student of the teacher. In general, these relationships may be referred to as "Manager-Associate Relationships". Various types of information in different formats (such as tickets or tokens) can be utilized with the systems and methods discussed herein. The systems and methods described herein do not require the use of secure communication protocols such as SSL (Secure Sockets Layer).

Although particular examples discussed herein relate to parental control authorization information for the Hotmail® service (a web-based email service provided by Microsoft Corporation of Redmond, Wash.), the systems and methods described herein can be used with any authorization information and with any other application or service, such as other Web-based applications or services. Further, particular examples described herein include a Web server. However, in alternate embodiments, the systems and methods discussed herein can be applied to any type of server or other computing system.

Figure 1:
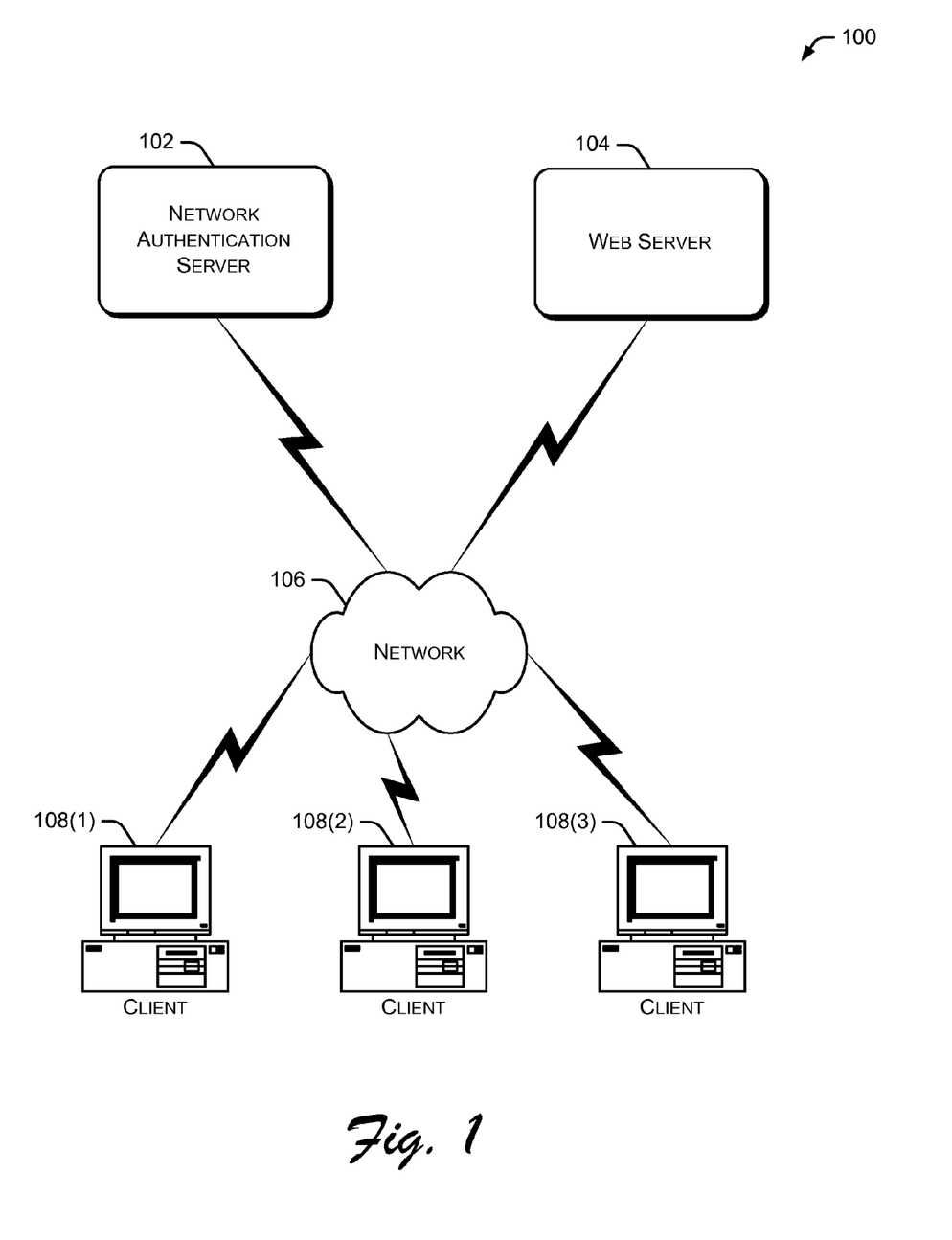
FIG. 1 is a block diagram of an exemplary network environment including a network authentication server, a Web server and multiple clients.

FIG. 1 is a block diagram of an exemplary network environment 100 including a network authentication server, a Web server and multiple clients. A network authentication server 102 and a web server 104 are coupled to a data communication network 106. Multiple clients 108(1), 108(2) and 108(3) are also coupled to network 106. Clients 108 communicate with network authentication server 102 and with web server 104 via network 106. For example, clients 108 may execute a browser application that communicates with servers 104 and 106. Network 106 may include one or more subnetworks coupled to one another. In a particular embodiment, network 106 is the Internet. A particular network environment 100 may include any number of network authentication servers, any number of Web servers and any number of clients coupled to one another via one or more networks.

Figure 2:
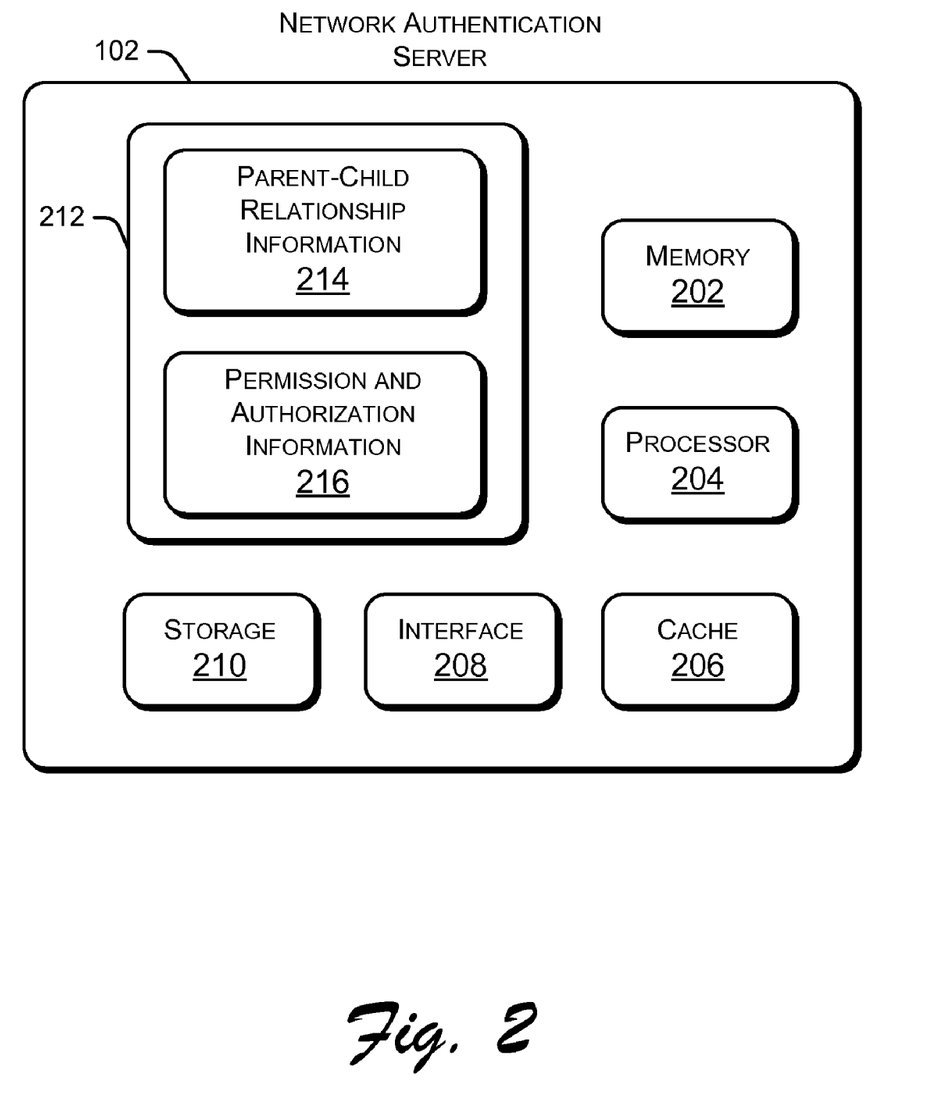
FIG. 2 is a block diagram illustrating various components and information contained in an example network authentication server.

FIG. 2 is a block diagram illustrating various components and information contained in example network authentication server 102. Network authentication server 102 includes a memory 202, a processor 204, a cache 206, an interface 208 and a storage device 210. Memory 202 stores data used by server 102 and generated by server 102 as it performs various functions. Processor 204 executes instructions that allow server 102 to perform certain functions. Cache 206 is a high-speed memory device that allows processor 204 to quickly access frequently used data. Interface 208 allows server 102 to communicate with other devices via network 106 or other communication links. Storage device 210 is, for example, a hard disk drive or other non-volatile storage device capable of storing data used by server 102.

As shown in FIG. 2, network authentication server 102 also includes a relationship and permission database 212. This relationship and permission database 212 is capable of maintaining information related to one or more different types of relationships, such as parent-child relationships, employer-employee relationships, teacher-student relationships, and the like. In the example of FIG. 2, relationship and permission database 212 contains parent-child relationship information 214. The relationship and permission database 212 also maintains various permissions and authorizations 216 associated with the supported relationships. In one embodiment, network authentication server 102 is a Microsoft® .NET Passport server. .NET Passport is an online service provided by Microsoft Corporation that makes it possible for individuals to use their email address and a single password to sign in to any .NET Passport-participating Web site or service. Additional details regarding the relationship information, and the permission and authentication information are provided below. Particular embodiments may include additional information and/or components not shown in FIG. 2.

The embodiment of FIG. 2 illustrates various permissions and authorizations 216 stored in network authentication server 102. In alternate embodiments, those permissions and authorizations may be stored in a web server 104 that applies the particular permissions and authorizations.

Figure 3:
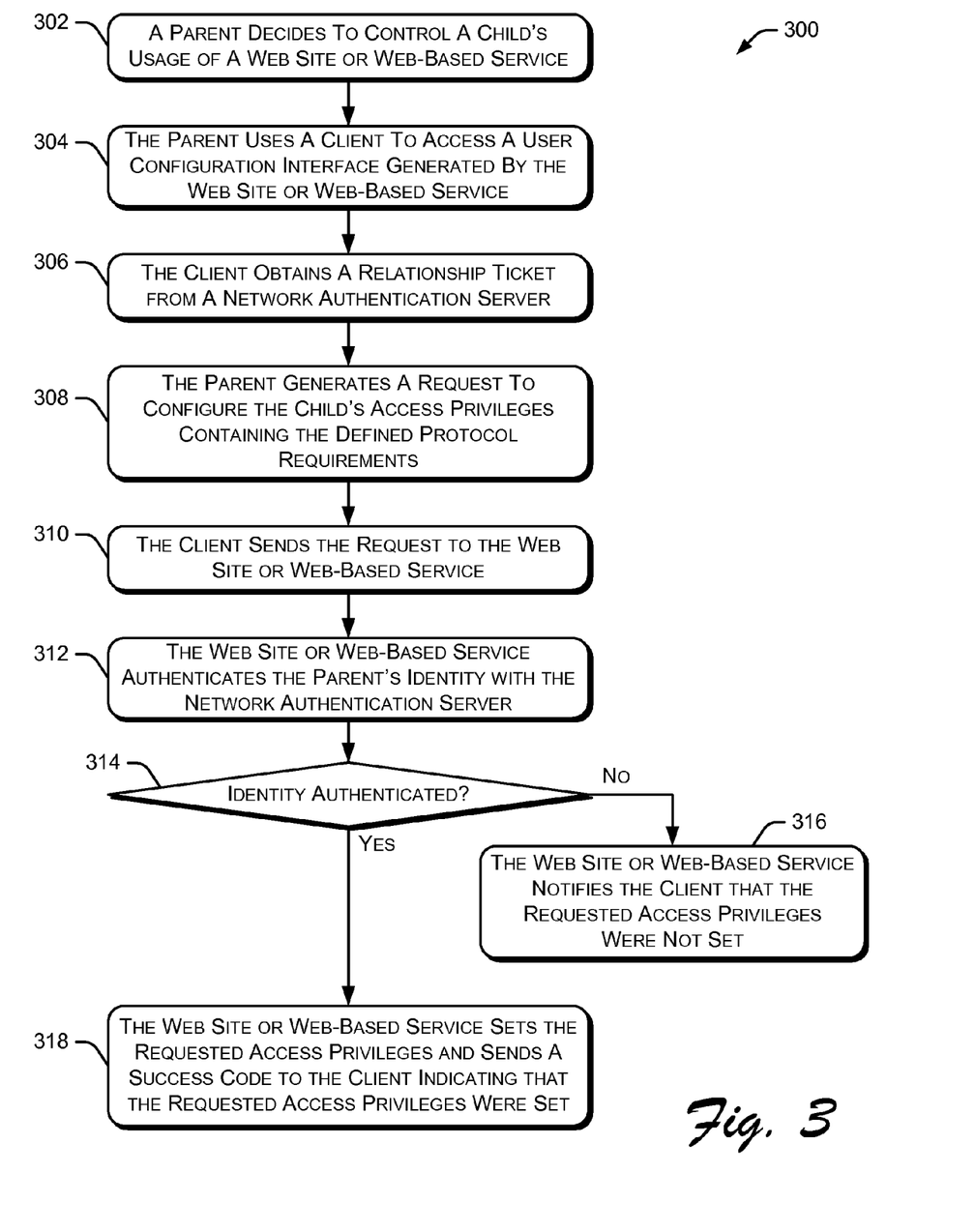
FIG. 3 is a flow diagram illustrating an embodiment of a procedure that allows a parent to establish a child's access privileges to a Web site or a Web-based service.

FIG. 3 is a flow diagram illustrating an embodiment of a procedure 300 that allows a parent to establish a child's access privileges to a Web site or a Web-based service. Initially, a parent decides to control a child's usage of a Web site or a Web-based service (block 302). The parent uses a client computing device to access a user configuration interface generated by the Web site or the Web-based service (block 304). The client computing device accesses the Web site or the Web-based service using an unsecure and/or untrusted communication link. An example of an unsecure or untrusted communication link is one that does not use any form of data encryption or other process for protecting the data from being read or understood by unintended recipients. An unsecure or untrusted communication link does not guarantee the confidentiality, integrity, or authenticity of the content carried on the communication link.

After accessing the Web site or Web-based service, the client computing device obtains a relationship ticket from a network authentication server (block 306). The relationship ticket is provided to the client after the parent has successfully verified their identity to the network authentication server. The relationship ticket contains information regarding the identity of the parent and the child as well as the relationship between the parent and the child (e.g., the parent controls the child's Web access privileges). The relationship ticket is encrypted such that the client computing device cannot decrypt the relationship ticket. Additional details regarding the relationship ticket are discussed below.

The parent then generates a request to configure the child's access privileges (i.e., for accessing the Web site or Web-based service) containing the defined protocol requirements (block 308). The client computing device sends the parent's request to the Web site or Web-based service (block 310). The client computing device also sends the relationship ticket with the parent's request. The Web site or Web-based service that receives the relationship ticket decrypts the relationship ticket.

After receiving the parent's request and the relationship ticket, the Web site or Web-based service authenticates the parent's identity with the network authentication server (block 312). If the parent's identity is not authenticated at block 314, the Web site or the Web-based service notifies the client computing device that the requested access privileges were not set (block 316). If the parent's identity is authenticated at block 314, the Web site or the Web-based service sets the requested access privileges and sends a successful response code to the client computing device indicating that the requested access privileges were set (block 318). Additional details regarding response codes are discussed below.

In an example of procedure 300, a parent may contact an email service to restrict a child's access to the email service. For example, the parent may restrict the number of incoming email messages the child can access, the number of outgoing email messages the child can send, email addresses from which the child can receive email messages, or email addresses to which the child can send email messages. Alternatively, the parent may prevent the child from sending or receiving any type of email message using the email service.

In a particular embodiment, the relationship ticket discussed above also contains an integrity check of the contents using a message authentication code (MAC). This integrity check is used in addition to the encryption discussed above. The server that receives the relationship ticket validates the integrity check to ensure that the relationship ticket is valid and has not been tampered with. If this integrity check fails, the server does not accept (or discards) the relationship ticket.

Figure 4:
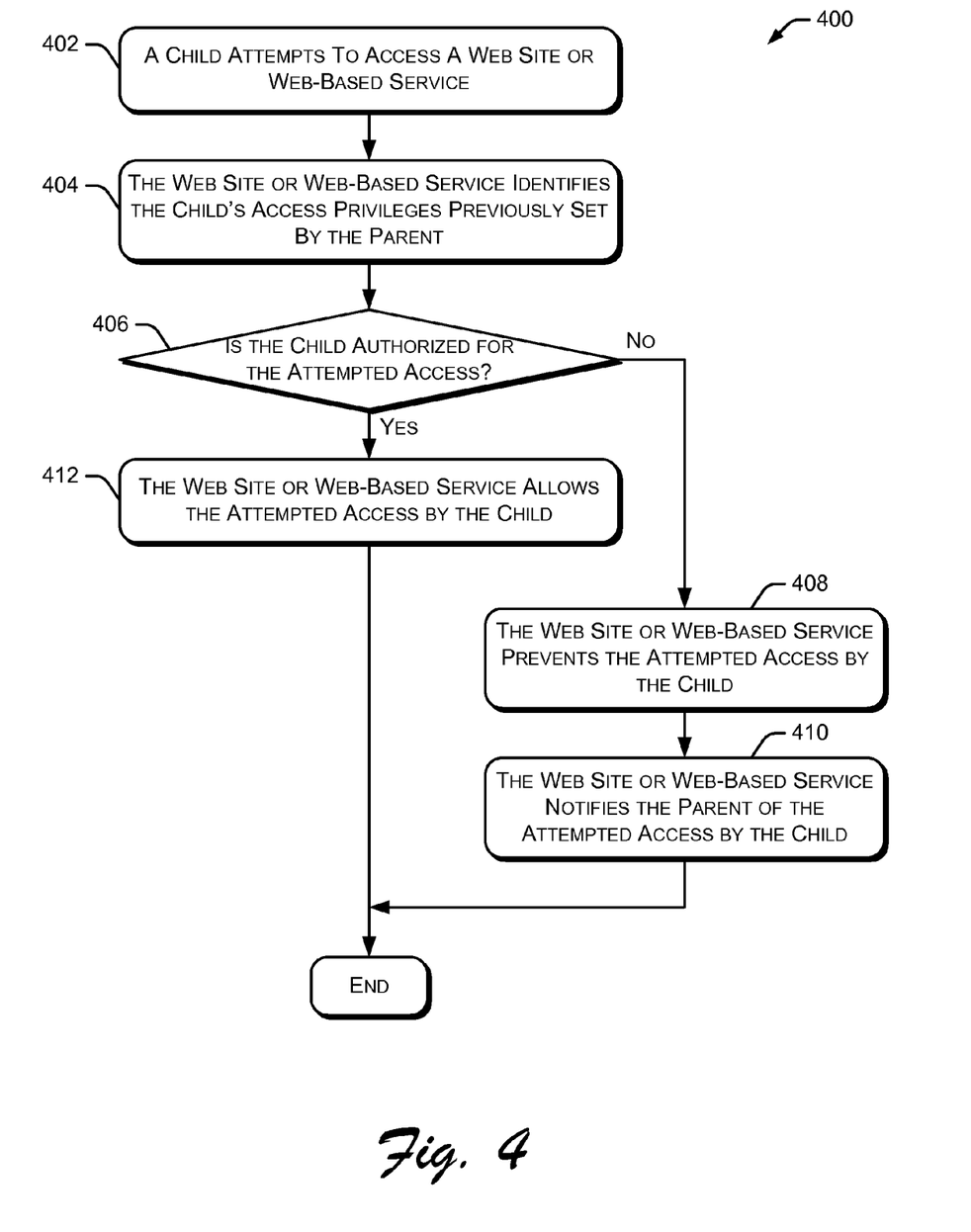
FIG. 4 is a flow diagram illustrating an embodiment of a procedure for processing a child's request to access a Web site or a Web-based service.

FIG. 4 is a flow diagram illustrating an embodiment of a procedure 400 for processing a child's request to access a web site or a Web-based service. Initially, a child attempts to access a Web site or a Web-based service (block 402). The Web site or Web-based service identifies the child's access privileges previously set by the parent (block 404), e.g., using the procedure discussed above with respect to FIG. 3. If the child is not authorized to perform the attempted access at block 406, the Web site or Web-based service prevents the attempted access by the child (block 408). Additionally, the Web site or Web-based service optionally notifies the parent of the attempted access by the child (block 410). If the child is authorized to perform the attempted access at block 406, the Web site or Web-based service allows the attempted access by the child (block 412).

A new protocol, discussed below, ensures security and reliability of the access control process, such as the parental control process, in a distributed environment. The relationship information between the parent-child relationship and the permission information are centrally stored by the network authentication server. The centralized information is securely transmitted to Web servers, such as a Hotmail electronic mail server, to ensure that the child's access to email is limited in the way that the parent desires. The protocol calls for any mediating client to obtain a relationship ticket from the network authentication server and then pass it on to the target site or server as a standard HTTP post. An HTTP post request is used to send data to a server for processing.

The network authentication server returns the success code if it can successfully persist the control/relationship values on its backend. For example, if a parent designates the child as a "managed restricted" account, any email that is sent to the child by anyone other than the ones in the permitted list of contacts will not be delivered into the child's account. Similarly, if the account is designated as "blocked", the child will not be able to login into his/her account unless the parent modifies the child's permissions stored on the network authentication server.

Table 1 below contains examples of various POST parameters that may be used with the systems and methods described herein. "PUID" refers to a .NET Passport User ID assigned to .NET Passport users.

TABLE 1

| Name | Description | Restrictions |
|---|---|---|
| MgrPUID | PUID of Manager Account | 16-digit hex |
| AssocPUID | PUID of Managed Account | 16-digit hex and matches the PUID in the Managed Account's DAT file |
| MgrEmail | Complete e-mail address of Manager Account | In the format user@domain.com; i.e., jdoe@hotmail.com |
| AssocEmail | Complete e-mail address of Managed Account | In the format user@domain.com; i.e., bsmith@msn.com |
| MSV | Managed State Value: [0|1|2|3] | 0 - Not Managed<br>1 - Managed (no restrictions)<br>2 - Managed with restrictions<br>3 - Managed and blocked (login to Hotmail forbidden) |
| Ticket | Encrypted Data (see below) | |

Table 2 below defines an example ticket structure (also referred to as a "relationship ticket structure") that may be used with the systems and methods described herein.

TABLE 2

| Name | Description | Size |
|---|---|---|
| Version | Hard-coded to {0x01, 0x00} for this example | 4 bytes |
| Timestamp | Julian time as returned by time( ) function call | 4 bytes |
| Manager's PUID (Low) | First 32 bits of Manager's PUID | 4 bytes |
| Manager's PUID (High) | Last 32 bits of Manager's PUID | 4 bytes |
| Managed account's PUID (Low) | First 32 bits of Managed account's PUID | 4 bytes |
| Managed account's PUID (High) | Last 32 bits of Managed account's PUID | 4 bytes |
| Policy ID | GUID | 16 bytes |
| Source status | enum | 4 bytes |
| Destination status | enum | 4 bytes |
| Relationship ID | GUID | 16 bytes |
| Total | | 64 bytes |

In the above table, "Manager" refers to the parent and "Associate" refers to the child. The server returns the success code after if it can successfully persist the control/relationship values on its backend. Any errors are returned via error codes when they arise. The response is a standard HTTP response with the status code returned in the HTTP status header. The values for the "Source status" and the "Destination status" come from a predefined set of constants that represent aspects of the relationship, such as whether it is pending, approved, denied, etc. "GUID" refers to a globally unique identifier that is used to uniquely identify objects and entities.

These controls will immediately come into effect. For example, if the parent designates the child as a "managed restricted" account, any email that is sent to the child by anyone other than the individuals in the permitted list of contacts will not be delivered into the child's account. Similarly, if the account is blocked, the child will not be able to login into the account unless the parent modifies the child's permissions.

Table 3 below identifies example response codes that may be generated by the Hotmail system and returned to the client.

TABLE 3

| Code | Code Description | Detailed Description |
|---|---|---|
| 200 | OK | No Problems or Errors |
| 420 | MgrPUID Invalid | MgrPUID missing or is not a string of 16 hex digits |
| 430 | MgrEmail Invalid | MgrEmail is missing or is not a valid email address (not of x@y.z form, unprintable characters, spaces or control characters present) |
| 440 | AssocPUID Invalid | AssocPUID missing or is not a string of 16 hex digits |
| 441 | AssocPUID Not Matched | AssocPUID does not match with ID in the file |
| 450 | AssocEmail Invalid | AssocEmail is missing or is not a valid email address (not of x@y.z form, unprintable characters, spaces or control characters present) |
| 451 | Assoc Account Does Not Exist | No account with email AssocEmail exists at Hotmail |
| 452 | Assoc Account Down | The account represented by AssocEmail is down |
| 453 | ABCH Sync Failed | The call to the Address Book Clearing House failed |
| 460 | MSV Invalid | Missing or invalid MSV value |
| 470 | Ticket Invalid | Absent or invalid ticket -- either the PUIDs do not match up or the ticket doesn't decrypt properly |
| 471 | Ticket Stale | The timestamp in the ticket is too old |
| 480 | Insufficient Manager credentials | Cookies for the manager not present or do not decrypt properly or do not match with MgrPUID and MgrEmail |
| 499 | N/A | Any errors that we don't know about |

Figure 5:
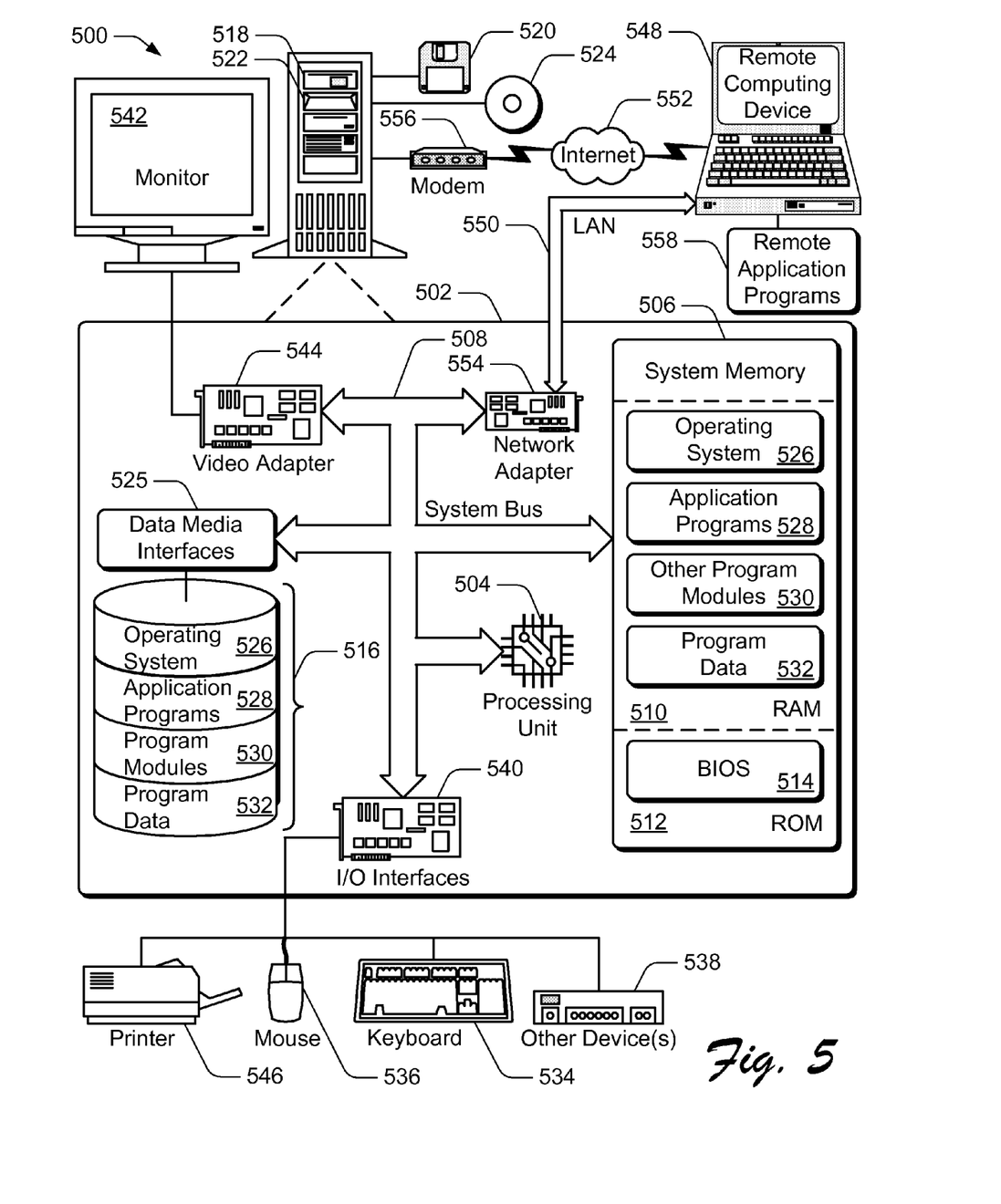
FIG. 5 illustrates a general computer environment, which can be used to implement the techniques described herein.

FIG. 5 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. For example, computer 502 can be used to implement the functions of a network authentication server, a Web server, or a client computing device as discussed herein. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
accessing, by a managerial entity via a client computing device, a user configuration interface generated by a web-based service;
communicating, by the client computing device, a managerial identity to an authentication server for verification;
receiving a relationship ticket from the authentication server after the managerial identity has been successfully verified,
wherein the relationship ticket received from the authentication server is encrypted so that the relationship ticket cannot be decrypted by the client computing device,
wherein the relationship ticket includes the managerial identity and identifies an associate entity that is to have limited access to the web-based service;
generating, by the managerial entity via the client computing device, a request to establish a selected permission level for the associate entity which will limit access by the associate entity to the web-based service;
sending, by the client computing device, the request and the relationship ticket to the web-based service to:
decrypt the relationship ticket;
authenticate the managerial identity, wherein the web-based service authenticates the managerial identity with the authentication server using contents of the relationship ticket; and
establish the selected permission level for the associate entity; and
receiving, by the client computing device, a success code from the web-based service if the selected permission level is established for the associate entity, wherein the method does not require the use of secure communications protocols including SSL (Security Socket Layer), wherein the client computing device, the web-based service and the authentication server communicate using an unsecure or untrusted communication link.

2. A method as recited in claim 1 further including receiving a failure notification from the web-based service if the selected permission level is not established.

3. A method as recited in claim 1 wherein sending the request to the web-based service includes using an untrusted connection with the web-based service.

4. A method as recited in claim 1 wherein the request to the web-based service is sent using an unsecure connection with the web-based service.

5. A method as recited in claim 1 wherein the relationship ticket is encrypted by the authentication server.

6. A method as recited in claim 1 wherein the selected permission level is established if the relationship ticket is authenticated.

7. A method as recited in claim 1 wherein the authentication server is a .NET Passport server.

8. A method as recited in claim 1 wherein selecting a permission level associated with an associate entity usage of a web-based service is performed by a managerial entity of the associate entity.

9. A computer program stored in one or more computer storage devices to execute the method recited in claim 1.

10. A method comprising:
communicating, by a parental entity via a client computing device, a parental identity to an authentication server for verification;
receiving a relationship ticket from the authentication server after the parental identity has been successfully verified, wherein the relationship ticket received from the authentication server is encrypted so that the relationship ticket cannot be decrypted by the client computing device which receives the relationship ticket, wherein the relationship ticket includes the parental identity and identifies a child that is to have limited access to a web server;
generating, by the parental entity via the client computing device, a request to establish a selected permission level for the child which will limit the access of the child to the web server;
sending, by the parental entity via the client computing device, the request and the relationship ticket to the web server to:
decrypt the relationship ticket;
authenticate the parental identity, wherein the web server authenticates the parental identity with the authentication server using contents of the relationship ticket; and
establish the selected permission level for the child; and
receiving, by the parental entity via the client computing device, a success code from the web server if the selected permission level is established for the child, wherein the method does not require the use of secure communications protocols including SSL (Security Socket Layer), wherein the client computing device, the web server and the authentication server communicate using an unsecure and untrusted communication link.

11. A method as recited in claim 10 wherein the relationship ticket is encrypted by the authentication server.

12. A method as recited in claim 10 wherein the relationship ticket is encrypted by the authentication server, and wherein the relationship ticket is decrypted by the web server.

13. A method as recited in claim 10 wherein the selected permission level is established if the relationship ticket is authenticated.

14. A method as recited in claim 10 wherein the authentication server is a .NET Passport server.

15. A method as recited in claim 10 wherein selecting a permission level associated with a usage of a web-based service by the child is performed by the parental entity.

16. A computer program stored in one or more computer storage devices to execute the method recited in claim 10.

17. One or more computer storage devices having computer-executable instructions stored thereon that, when executed, direct a client computing device to perform a method, the method comprising:

selecting, by an employer via the client computing device, a web-based system access permission level associated with an employee;

obtaining, by the employer via the client computing device, a relationship ticket from an authentication server, wherein the relationship ticket obtained from the authentication server is encrypted and includes information regarding an employer identity and information regarding an identity of the employee, wherein the relationship ticket received from the authentication server is encrypted so that the relationship ticket cannot be decrypted by the client computing device, wherein the web-based system access by the employee is to be limited;

generating, by the employer via the client computing device, a request to establish a selected permission level for the employee which will limit access to the web-based system by the employee;

sending the request and the relationship ticket to the web-based system for decryption of the relationship ticket, authentication of the employer identity with the authentication server facilitated by the relationship ticket, and establishment of the selected permission level for the employee; and receiving a success code from the web-based system if the requested permission level is established for the employee, wherein the method does not require the use of secure communications protocols including SSL (Security Socket Layer) and the client computing device, the web-based system and the authentication server communicate using an unsecure and untrusted communication link.

\* \* \* \* \*